UNITED STATES PATENT OFFICE.

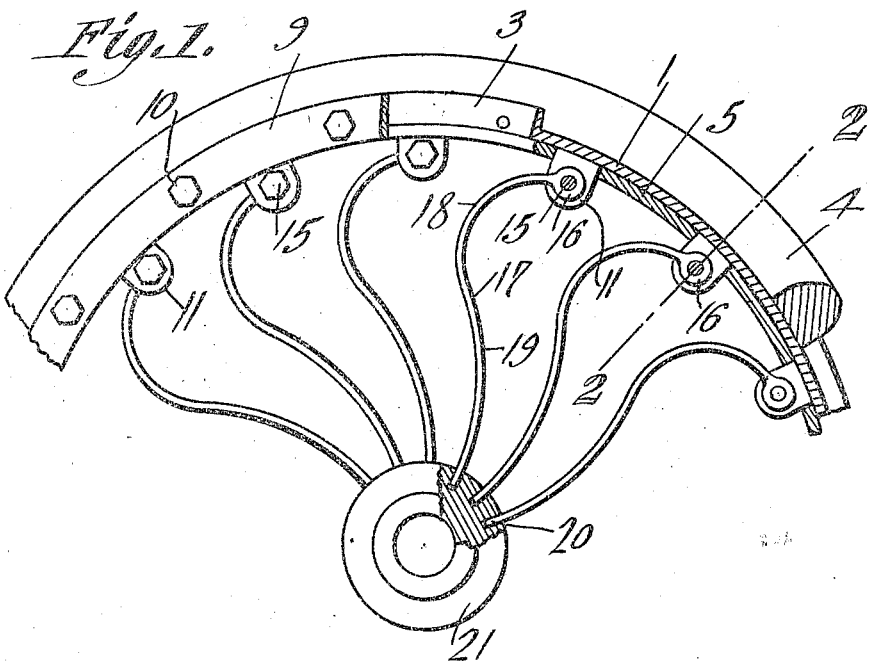

WILLIAM H. SWIGART, OF LUCAS, OHIO.

SPRING-WHEEL.

1,231,965.                    Specification of Letters Patent.       Patented July 3, 1917.

Application filed June 23, 1916.  Serial No. 105,485.

*To all whom it may concern:*

Be it known that I, WILLIAM H. SWIGART, a citizen of the United States, residing at Lucas, in the county of Richland and State of Ohio, have invented a new and useful Spring-Wheel, of which the following is a specification.

The device forming the subject matter of this application is a spring wheel, and one object of the invention is to provide novel means for connecting the outer ends of the spring spokes with the inner rim of the wheel.

Another object of the invention is to provide a novel form of inner rim, adapted to coact with an outer rim, and constructed, in a novel manner, to receive the outer ends of the spring spokes.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 is a side elevation showing a portion of a wheel embodying the invention, parts appearing in section;

Fig. 2 is a cross section on the line 2—2 of Fig. 1; and

Fig. 3 is a fragmental plan showing a portion of the inner rim and parts carried thereby, it being presupposed that the observer is looking outwardly from the hub of the wheel toward the rim.

In carrying out the present invention there is provided an outer rim 1 preferably made of metal and including parallel side flanges 2 and 3 or other suitable devices adapted to retain on the outer rim 1, a tire 4. The tire 4 may be made of any suitable material. Rubber may be employed in the making of the tire 4, if it is desired to avoid noise, the resiliency of the device being afforded by means of spring spokes hereinafter described.

The numeral 5 indicates an inner rim ordinarily made of metal and provided along one edge with a laterally projecting flange 6 having an outwardly extended lip 7. The opposite edge of the inner rim 5 constitutes a flange 8, the outer edge of which is vertically disposed, the flange 8 being devoid of such an element as the lip 7 which is carried by the flange 6.

The outer rim 1 rests on the flanges 8 and 6 and abuts against the lip 7. By means of the lip 7, the outer rim 1 is prevented from moving in one direction. An annular side plate 9 abuts against the flange 3 of the outer rim 1 and against the outer vertical edge of the flange 8 of the inner rim 5. Any suitable means (not shown) may be employed for attaching the side plate 9 to the rim 5. Securing elements, which may be headed screws 10, connect the annular side plate 9 with the flange 3 of the outer rim 1.

Opposed ears 11 are struck inwardly from the inner rim 5, these ears 11 defining openings 12 in the inner rim. The ears 11 are sufficiently short so that there remains, between the openings 12, an integral web 14, which serves to strengthen the inner rim 5 greatly, and to prevent a weakening thereof, caused by the formation of the openings 12.

The ears 11 are connected by securing elements 15 which may be bolts, the same receiving eyes 16 located at the outer ends of spring spokes 17, the eyes 16 lying between the ears 11. The spring spokes 17, which are made of metal, are curved in opposite directions, circumferentially of the wheel, as shown at 18 and at 19. The outer portions 18 of the spring spokes 17 are curved on a shorter radius than are the inner portions 19 of the spokes. The inner extremities 20 of the spring spokes 17 are approximately straight and are received in a hub 21. The hub 21 is made of metal, preferably, and is cast about the inner ends 20 of the spokes.

Having thus described the invention, what is claimed is:—

In a device of the class described, a rim having spaced ears struck therefrom to define pairs of openings and to form integral ribs extended between the openings of the pairs; a hub; spokes connected with the hub and provided at their outer ends with tubular eyes disposed between the ears and constituting means for preventing the ears from bending inwardly toward the openings, the openings being located in radial alinement with the eyes; and securing elements passing through the eyes and engaged terminally with the ears to prevent the same from folding outwardly.

In testimony that I claim the foregoing as my own, I have hereto affixed my signature in the presence of two witnesses.

WILLIAM H. SWIGART.

Witnesses:
  JOHN F. KRAMER.
  T. B. JARVIS.